United States Patent

Roux

[11] Patent Number: 5,369,673
[45] Date of Patent: Nov. 29, 1994

[54] FRAMED DIGITAL SIGNAL REGENERATOR SUITABLE FOR MICROWAVE DIGITAL TRANSMISSION INSTALLATIONS

[75] Inventor: Pierre Roux, Argenteuil, France

[73] Assignee: Société Anonyme dite Alcatel Telspace, Nanterre Cedex, France

[21] Appl. No.: 48,431

[22] Filed: Apr. 20, 1993

[30] Foreign Application Priority Data

Apr. 28, 1992 [FR] France ................. 92 05233

[51] Int. Cl.[5] .................. H04B 3/36; H03H 7/30
[52] U.S. Cl. ........................ 375/118; 375/14
[58] Field of Search ............ 375/14, 118, 112, 3; 370/102; 364/724.19, 724.2

[56] References Cited

U.S. PATENT DOCUMENTS

| | | | |
|---|---|---|---|
| 5,018,166 | 5/1991 | Tjahjadi et al. | 375/12 |
| 5,131,013 | 7/1992 | Choi | 375/118 |
| 5,146,477 | 9/1992 | Cantoni et al. | 375/118 X |
| 5,175,746 | 12/1992 | Inoue et al. | 375/118 X |

FOREIGN PATENT DOCUMENTS

| | | |
|---|---|---|
| 0353891 | 2/1990 | European Pat. Off. |
| WO8807300 | 9/1988 | WIPO |

Primary Examiner—Tesfaldet Bocure
Attorney, Agent, or Firm—Sughrue, Mion, Zinn, Macpeak & Seas

[57] ABSTRACT

A regenerator for regenerating received framed digital signals including justification bit includes an arrangement associating justification mechanisms with the operation of a fractionally spaced self-adaptive equalizer which is modified to accept instructions to rotate its coefficients. The regenerator is particularly suitable for microwave digital transmission. Jitter does not accumulate in the regenerator which may be implemented entirely in digital circuits.

6 Claims, 3 Drawing Sheets

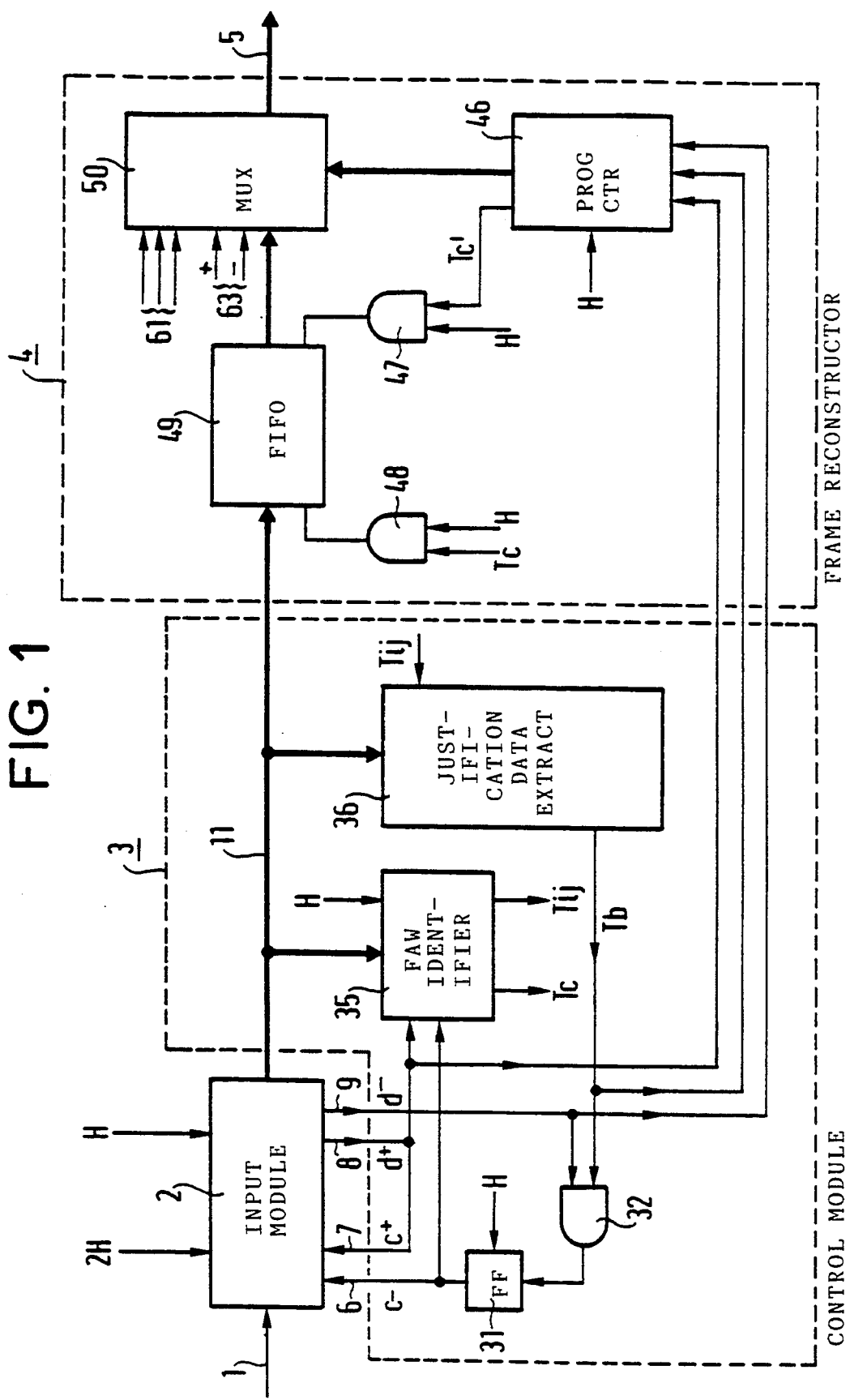

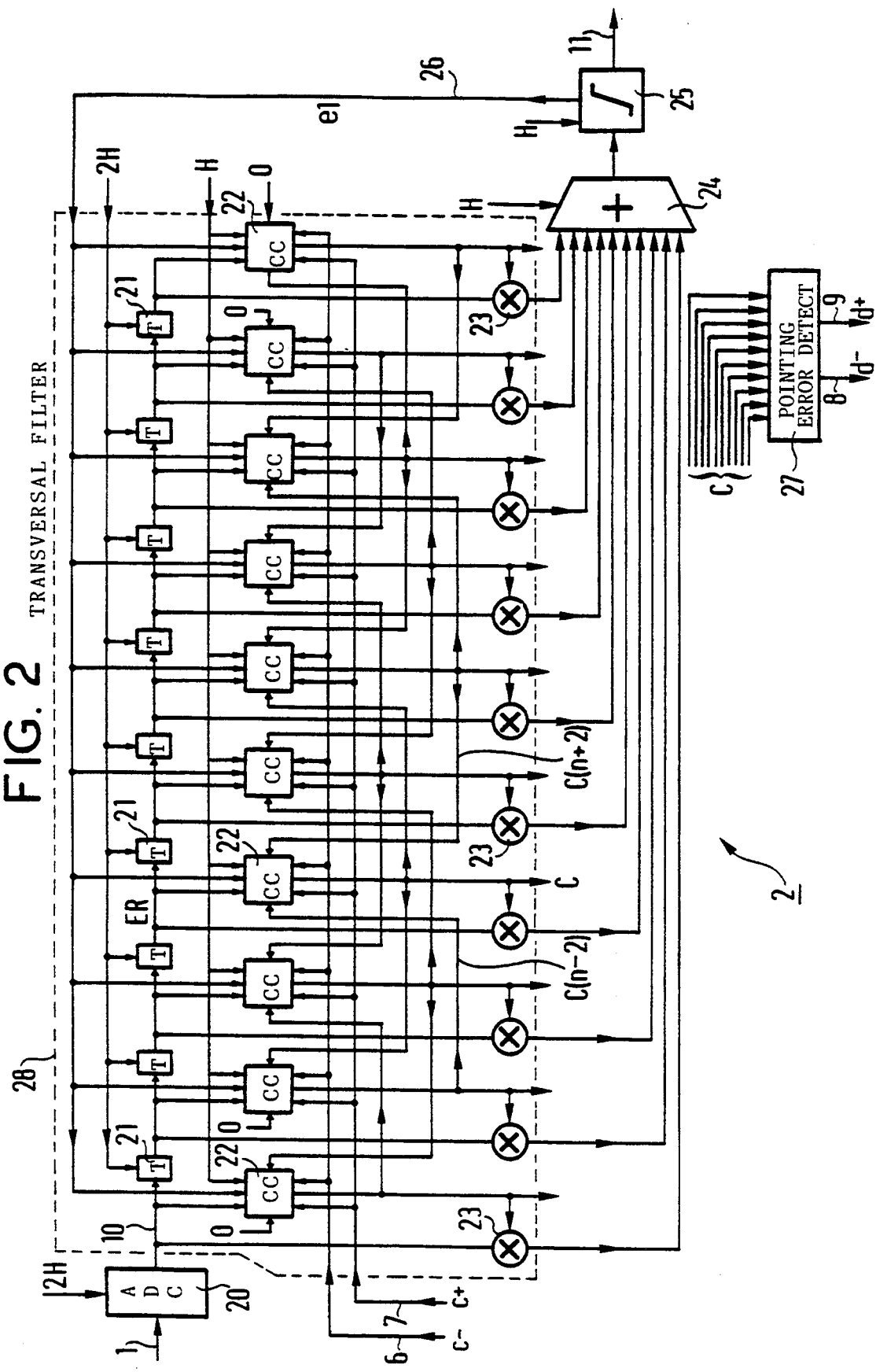
FIG. 2 TRANSVERSAL FILTER

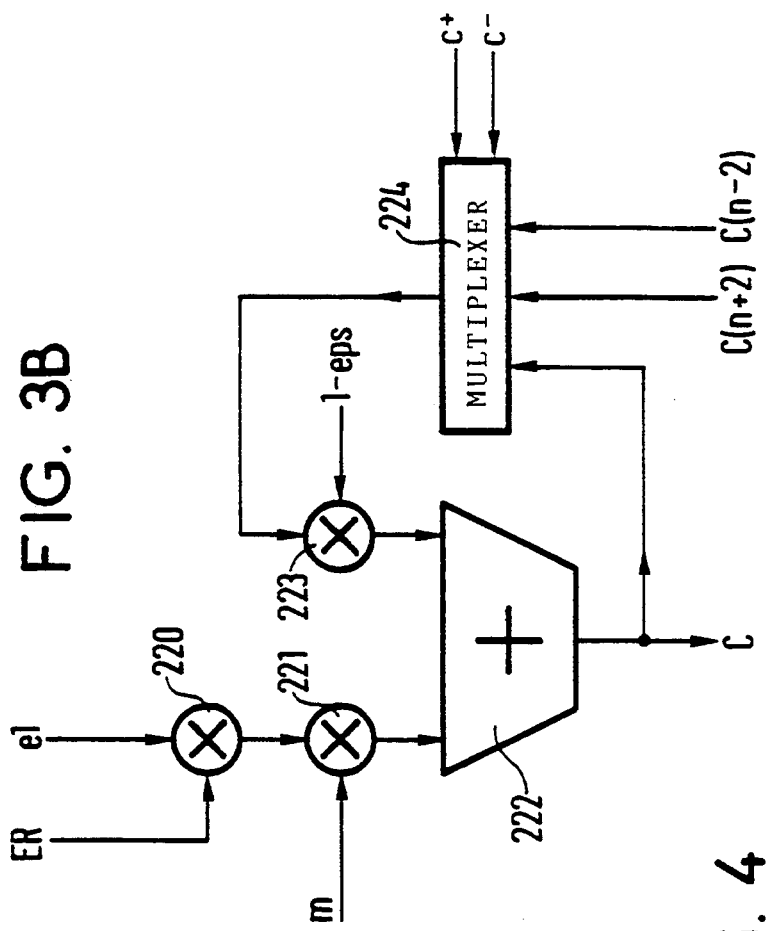
FIG. 3A
FIG. 3B
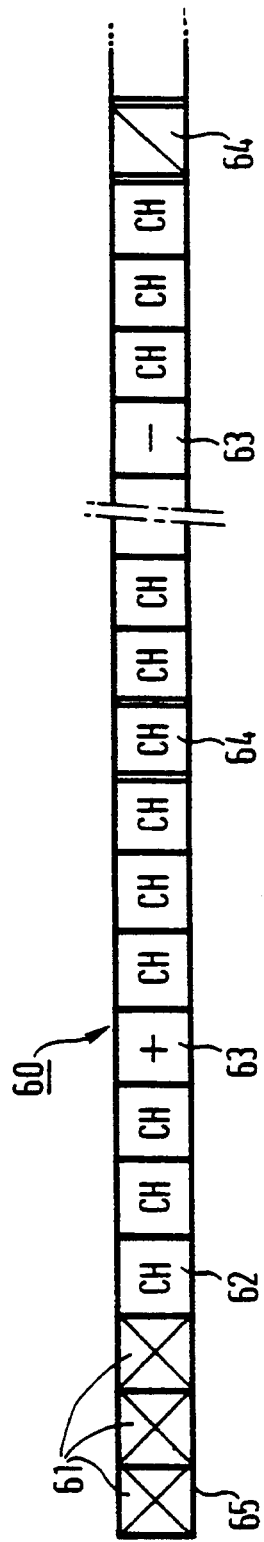
FIG. 4

FRAMED DIGITAL SIGNAL REGENERATOR SUITABLE FOR MICROWAVE DIGITAL TRANSMISSION INSTALLATIONS

BACKGROUND OF THE INVENTION

1. Field of the Invention

The invention concerns a regenerator for transmitting digital signal frames including payload bits and justification bits, comprising extractor means to extract the digital signals from the incoming frames, reconstructor means including a memory in which said digital signals extracted from the incoming frames are stored temporarily and which is adapted to form from the digital signals stored in the memory frames to be transmitted under the control of an internal clock, and control means operating on said digital signals extracted from the incoming frame to compensate for differences between the clock under whose control the incoming frames were sent and the internal clock.

2. Description of the Prior Art

A regenerator of this kind is known from patent application WO88.07300. This type of regenerator is suitable for networks transmitting digital signals over long distances and in particular over microwave links.

In a digital transmission system the transmitter is often associated with plesiochronous multiplexing means and constructs a composite digital signal in the form of frames. Each frame conventionally comprises consecutive frame bits in the form of pulses sent by the transmitter at the send timing. The frame bits conventionally comprise payload bits, justification indication bits and at least one justification opportunity bit.

The regenerator known from the above-mentioned document is designed so that there is no accumulation of jitter between two nodes of a network. This jitter appears in the regenerators which send frames under the control of a clock derived from the clock under whose control the incoming frames were sent.

In this known regenerator the extractor module uses a phase-locked loop to derive a first clock from digital signals extracted from the received frames. The digital signals include the payload bits and the justification bits and are clocked into the memory by the first clock and clocked out from the memory by an internal clock to form regenerated frames. The reconstructor module is adapted to eliminate or add justification bits in the regenerated frames under the control of the control means to compensate for differences between the clock under whose control the regenerated frames are sent and the clock under whose control the incoming frames were sent. One problem experienced with this type of regenerator is that the regenerated frames are not necessarily the same size as the incoming frames because justification bits have been removed or added. It is then necessary to include in each regenerated frame an additional data field giving the number of justification bits in the frame. Moreover, this type of regenerator is not suitable for digital signal frames including justification bits including justification indicator bits and justification opportunity bits at fixed positions within each frame. With this type of frame it is not possible to reposition the justification bits in the reconstructed frame. Nor is it possible to reduce or increase the frame size. What is more, some justification opportunity bits may be wanted data bits. Therefore these justification opportunity bits cannot be eliminated to compensate differences between the clock under whose control the incoming frames were sent and the clock under whose control the regenerated frames are sent.

An object of the invention is to remedy the above-mentioned drawbacks by proposing a regenerator in which jitter does not accumulate, which does not include any phase-locked loop and which is suitable for frames including justification indicator bits and justification opportunity bits.

SUMMARY OF THE INVENTION

The present invention consists in a regenerator for transmitting digital signal frames including payload bits and justification bits, said regenerator comprising extractor means to extract the digital signals from incoming frames, reconstructor means including a memory in which said digital signals extracted from said incoming frames are stored temporarily and which is adapted to form from said digital signals stored in said memory frames to be transmitted under the control of an internal clock signal, and control means operating on said digital signals extracted from said incoming frames to compensate differences between said internal clock and the clock under whose control said incoming frames were sent, in which regenerator:

a) said extractor means comprise a fractionally spaced equalizer with a plurality of taps controlled at a frequency which is a multiple of the frequency of said internal clock and which supplies said digital signals of said incoming frames at a rate set by said internal clock, said extractor means being adapted to derive first and second error signals representing differences between said internal clock and the clock under whose control said incoming frames were sent and said equalizer being adapted to eliminate or duplicate digital signals in response to first and second control signals;

b) said control means are adapted to derive from said digital signals at the output of said equalizer said first control signal indicating that a payload bit in an incoming frame is present at the output of said equalizer and said second control signal indicating that a justification bit of an incoming frame containing padding data is present in said equalizer, to derive said first control signal from said first error signal and said second control signal so that said equalizer eliminates only padding bits from incoming frames in response to said first control signal and to derive said second control signal from said second error signal so that said equalizer duplicates payload bits or Justification bits of incoming frames in response to said second control signal; and c) said reconstructor means are adapted to control the writing into said memory of payload bits indicated by said first control signal and to form frames to be transmitted from payload bits stored in said memory and regenerated Justification bits, A regenerator in accordance with the invention has the advantage that it does not include any phase-locked loops, It is therefore easy to implement using digital circuits which require no setting up prior to use, One embodiment of the invention is described in detail hereinafter with reference to the appended drawings,

BRIEF DESCRIPTION OF THE DRAWINGS

FIG. 1 is a functional block diagram of a regenerator in accordance with the invention, FIG. 2 is a more detailed representation of part of this regenerator including the fractionally spaced equalizer, FIGS. 3A and 3B show in more detail parts of the equalizer seen in FIG. 2, FIG. 4 shows one frame of a digital signal received by the regenerator and/or regenerated by it.

DETAILED DESCRIPTION OF THE INVENTION

This regenerator in accordance with the invention is adapted to regenerate an incoming framed digital signal. FIG. 4 shows a typical frame 60 of the digital signal received by the regenerator. It is made up of consecutive frame bits 65 conventionally comprising frame alignment bits 61 grouped together at the start of the frame to form a frame alignment word (FAW), payload bits 62 conveying wanted data (CH) and justification bits 63, 64 interleaved with the payload bits. The frame bits can be viewed as sets of bits. The justification bits comprise justification indicator bits 63 containing an indication of justification (+ and −) and justification opportunity bits 64 conveying either wanted data (CH) or justification data (/). One or more justification indicator bits precede a justification opportunity bit and their content indicates whether the justification opportunity bit contains wanted data or justification data. In the example shown each justification opportunity bit is preceded by a single justification indicator bit. To facilitate an understanding of the invention, the symbol + in a justification indicator bit indicates that the subsequent justification opportunity bit contains wanted data and the symbol − indicates that the justification opportunity bit is a justification bit, for example. All the frames constituting the received digital signal contain the same number of frame bits 65 and the same number of justification bits distributed in the frames at the same positions. This conventional type of coding enables plesiochronous multiplexing, as is well known.

Referring now to FIG. 1, a regenerator in accordance with the invention comprises an input module 2 which receives the digital signal 1 in the form of frames 60. The function of the input module is to sample the received signal, where necessary after demodulation, to supply a succession of frame bits 65 timed by an internal clock H. The input module also supplies two error signals d+ and d− at respective outputs 8 and 9 and is responsive to two control signals c+ and c− at respective inputs 6 and 7. The two error signals d+ and d− each represent a phase difference between the internal clock and the clock under whose control the frame bits received by the input module were sent. A control module 3 supplies one of the two control signals to the input module 2 in response to one of the two error signals. The input module responds to one of the two control signals by operating on the justification bits 63, 64 in the succession of frame bits in a manner explained hereinafter.

The regenerator also includes a frame reconstructor module 4 which is responsive to the control signals. Its function is to reconstruct new frames from frame bits supplied by the input module and to produce at the output 5 a regenerated digital signal formed by these new frames.

FIG. 2 shows the input module in more detail. It essentially comprises a fractionally spaced equalizer modified to produce the error signals and to respond to the control signals. Using this equalizer eliminates the need for any analog phase-locked loop. The module also includes an analog/digital converter (ADC) 20 which receives the digital signal 1 and samples it under the control of a clock at a multiple of the internal clock frequency (a clock 2H at twice this frequency, for example) to produce in the conventional manner digital samples at the output 10. The equalizer comprises a transversal filter 28 to which the digital samples produced by the converter 20 are supplied at the rate of two samples per symbol interval. The transversal filter 28 comprises time-delay taps 21 controlled by the clock 2H to hold a plurality of successive digital samples. The transversal filter 28 also comprises coefficient calculator units (CC) 22 shown in more detail in figures 3A and 3B. The digital samples at the output 10 or the delayed samples at the time-delay taps 21 are multiplied by coefficients in multipliers 23 which are connected to a summing circuit 24 which produces symbols under the control of the clock 2H. The circuit 24 is connected to a decision circuit 25 which provides decided symbols at the output 11 under the control of the internal clock H and an error signal e1 at the output 26. The decided symbols at the output 11 represent frame bits. The error signal at the output 26 is supplied to the coefficient calculator units 22. The error signal e1 conventionally represents the difference between the samples received at the decision circuit input and the decided symbols. The coefficients supplied by the units 22 are calculated using a tap leakage algorithm.

Referring to FIGS. 3A and 3B, a coefficient calculator unit 22 receives the internal clock H, the error signal e1 at the output 26, delayed samples ER and coefficients $C(-2)$ and $C(+2)$ from the two coefficient calculator units 22 adjacent the unit 22 in question, as shown in FIG. 2. The two units 22 at the lefthand side of FIG. 2 receive as coefficients $C(-2)$ null coefficients (0) and the two units 22 at the righthand side of FIG. 2 receive as coefficients $C(+2)$ null coefficients (also 0). FIG. 2 shows one implementation of a transversal filter comprising nine time-delay taps 22 associated with two coefficient calculator units 22. The man skilled in the art knows how to modify the number of time-delay taps to suit the nature of the transmission channel for the digital signal received by the input module 2. The units 22 also receive the control signals c+ and c−. Each calculator unit produces a coefficient C from the input data previously mentioned.

FIG. 3B shows a unit 22 for calculating a coefficient C in more detail. The error signal e1 is correlated with the delayed samples ER in a multiplier 220. The output of the multiplier 220 is weighted in a multiplier 221 by a factor m representing an integration step which depends on the rate at which the coefficients are required to converge. The output of the multiplier 221 feeds an integrator 222. The coefficient calculator unit 22 also includes a multiplexer 224 responsive to the control signals c+ and c− and adapted to substitute for the accumulator result associated with the coefficient $C(n)$ that associated with the coefficient $C(m+2)$ or $C(n-2)$. A multiplier 223 is included in the integrator loop to bias the integrator to introduce a forced return to zero which is necessary for controlling a fractionally spaced equalizer. The multiplier coefficient is $(1-\mathrm{eps})$ where eps is close to zero (0).

The unit 22 for calculating a coefficient C operates in the following manner. In response to the control signal c+ the calculator unit 22 produces as coefficient $C(n)$ the coefficient $C(n-2)$ which causes a first rotation of the coefficients C in the equalizer 28. The effect of the control signal c+ on the calculator units 22 is to duplicate a symbol: the input digital signal is "delayed" at the equalizer output by one symbol interval. In response to the control signal c— the calculator unit 22 produces as coefficient C(n) the coefficient C(n+2) which causes rotation of the coefficients C in the equalizer 28 in the opposite direction. The effect of the control signal c— on the calculator units 22 is to eliminate a symbol: the input digital signal is "advanced" at the equalizer output by one symbol interval.

The value of the coefficients supplied by the calculator units 22 varies with the phase difference between the internal clock H and the clock under whose control the received frame bits were sent. The coefficients C conventionally comprise a particular central coefficient supplied by the calculator unit 22 which is substantially in the middle of the line of calculator units 22. In the example shown in FIG. 2 the central coefficient may be delivered by the fourth calculator unit 22 from the left. The coefficients delivered by the calculator units 22 to the right of this unit generate coefficients C symmetrical to those delivered by the calculator units 22 to the left of the unit 22 in question if the internal clock H is identical to the received frame bit clock. The sampling instant in the converter 20 is then "optimal". When the sampling instant is not optimal the coefficients C lack symmetry and this is exploited by a pointing error detector circuit 27 which produces the respective error signals d— and d+ at the outputs 8 and 9 by inspecting the coefficients C supplied by the coefficient calculator units 22. The pointing error may represent a difference between the values of the coefficients on each side of the central coefficient. The error signal d+ is produced by the circuit 27 if this difference is greater than a positive first threshold value and the error signal d— is produced by the circuit 27 if this difference is below a negative second threshold value. If the difference is between the two threshold values the circuit 23 does not produce any error signal. The error signal d+ indicates that the internal clock is faster than the clock under whose control the frame bits were sent. The error signal d— indicates that the internal clock is slower than the clock under whose control the frame bits were sent. The threshold values are loaded into a memory of the circuit 27 before the regenerator is put into service.

Referring again to FIG. 1, the control module 3 includes a frame alignment word identifier unit 35 which identifies the starts of each received frame by inspecting the content of the frame bits supplied by the input module 2 and present at the outputs 11 to supply a signal Tc indicating that the frame bit 65 at the outputs 11 referred to the internal clock H is a payload bit 62 and a signal Tij indicating that the frame bit is a justification indicator bit 63.

The control module 3 also includes a justification data extractor unit 36 which examines the content of the frame bits at the outputs 11 designated by the signal Tij to produce an anticipation signal Tb indicating that the justification opportunity bit 64 which follows on from the examined justification indicator bits is a padding bit.

In one embodiment of the regenerator the error signal d+ at the output 8 is matched if necessary and then applied directly to the input of the input module 2 as the control signal c+ at the input 7. In response to the control signal c+ the input module duplicates a symbol representing a payload bit or a justification indicator bit or a justification opportunity bit. In response to the error signal d+ the unit 35 does not produce any signal Tc to designate this duplicated decided signal at the output 11 as a payload bit.

Unlike the error signal d+ the error signal 3— supplied by the input module acts directly as a control signal c— only because the elimination of a decided symbol from the succession of decided symbols supplied by the input module 2 can be applied only to a padding bit. As seen in FIG. 1, the error signal d— is combined with the signal Tb in an AND gate 32 at whose output is the control signal c— supplied to the input module 2 via a flip-flop 31. The flip-flop 31 is activated by the internal clock H so as to supply the control signal c— to the input module during a single period. In response to the control signal c— the input module eliminates a padding bit 64 in the succession of frame bits that it provides at its output.

The input module 2 operates accordingly on the length of the received frames by adding a frame bit or removing a frame bit depending on the phase shift between the internal clock and the clock under whose control the received frame bits were sent. If n denotes the number of frame bits 65 of a received frame 60 the input module 2 produces a frame containing the same number of frame bits as the received frame or one fewer bits or one more bit and the function of the frame reconstructor module 4 is to reconstruct new frames of constant length comprising n frame bits.

Referring to FIG. 1, the frame reconstructor module 4 includes an FIFO memory 49 of sufficient capacity to store temporarily at least one succession of frame bits 65 contained in a received frame. Writing of the memory 49 is clocked by a combination of the internal clock H and the signal Tc produced by an AND gate 48 so as to store temporarily only the succession of payload bits 62. Reading of the memory 49 is clocked by a combination of the internal clock H and a signal Tc' indicating a payload bit in the reconstructed frame produced by an AND gate 47 so as to transfer the payload bits stored temporarily in the memory 49 to the input of a multiplexer 50 with the required temporal distribution. The frame reconstructor module 4 also receives from the control module 3 the error signals d+ and d— and the signal Tb so that it can count, for each frame received, the number of padding bits 64 required for the new frame to be reconstructed. This counting may be done in a programmable circuit 46 by a counter incremented in response to the error signal d+ (duplication of a frame bit) supplied by the input module or in response to the signal Tb supplied by the justification data extractor unit 36 if this latter signal is not associated with the error signal d— indicating that the incoming padding bit has been removed. At the padding opportunity times of the outgoing frame, if the count is positive the counter is decremented and a padding bit is added. The programmable circuit 46 supplies to the multiplexer 50 the payload bits 62 read from the memory 49 by means of the signal Tc' or new justification indicator bits 63 or reconstructed padding bits 64 or bits of the frame alignment word 61.

The multiplexer 50 supplies at its output new frames at 5 forming a regenerated digital signal. The phase difference between the regenerator internal clock and the clock under whose control the incoming receive signal was sent accepted by a regenerator in accordance with the invention depends on the number of padding bits 64 available in the frames received by the input module 2 of the regenerator.

A regenerator in accordance with the invention is easily implemented using conventional digital circuits to implement the functions of the input unit 2, the control unit 3 and the frame reconstructor unit 4.

Of course, the invention is not limited to the embodiment described hereinabove and other variants may be derived from the latter without departing from the scope of the invention.

There is claimed:

1. A regenerator for transmitting digital signal frames including payload bits and justification bits, said regenerator comprising extractor means to extract the digital signals from incoming frames, reconstructor means including a memory in which said digital signals extracted from said incoming frames are stored temporarily and which is adapted to form from said digital signals stored in said memory frames to be transmitted under the control of an internal clock signal, and control means operating on said digital signals extracted from said incoming frames to compensate differences between said internal clock and the clock under whose control said incoming frames were sent, in which regenerator:
  a) said extractor means comprise a fractionally spaced equalizer with a plurality of taps controlled at a frequency which is a multiple of the frequency of said internal clock and which supplies said digital signals of said incoming frames at a rate set by said internal clock, said extractor means being adapted to derive first and second error signals representing differences between said internal clock and the clock under whose control said incoming frames were sent and said equalizer being adapted to eliminate or duplicate digital signals in response to first and second control signals;
  b) said control means are adapted to derive from said digital signals at the output of said equalizer said first control signal indicating that a payload bit in an incoming frame is present at the output of said equalizer and said second control signal indicating that a justification bit of an incoming frame containing padding data is present in said equalizer, to derive said first control signal from said first error signal and said second control signal so that said equalizer eliminates only padding bits from incoming frames in response to said first control signal and to derive said second control signal from said second error signal so that said equalizer duplicates payload bits or justification bits of incoming frames in response to said second control signal; and
  c) said reconstructor means are adapted to control the writing into said memory of payload bits indicated by said first control signal and to form frames to be transmitted from payload bits stored in said memory and regenerated justification bits.

2. Regenerator according to claim 1 wherein said extractor means comprise error detector means adapted to supply said error signals upon detecting lack of symmetry in coefficients of said equalizer to either side of a central coefficient of said equalizer.

3. Regenerator according to claim 2 wherein said fractionally spaced equalizer comprises coefficient calculator means associated with multipliers and adapted to rotate the coefficients supplied to said multipliers in response to one or other of said control signals.

4. Regenerator according to claim 1 wherein said first error signal indicates that said internal clock is slower than said clock under whose control said incoming frames were sent and said second error signal indicates that said internal clock is faster than said clock under whose control said incoming frames were sent.

5. Regenerator according to claim 1 wherein said control means supplies said second error signal, received from said extractor means as said second control signal.

6. Regenerator according to claim 1 wherein said justification bits comprise justification indicator bits and justification opportunity bits associated with said justification indicator bits and said control means are adapted to derive said second control signal by observing justification indicator bits at the output of said extractor module.

* * * * *